Patented Oct. 3, 1939

2,175,083

UNITED STATES PATENT OFFICE 2,175,083

COMPOSITIONS OF MATTER CONTAINING ANTIHYGROSCOPIC AGENTS

Havard L. Keil, Chicago, Ill., assignor to Armour and Company, Chicago, Ill., a corporation of Illinois No Drawing. Application March 1, 1937, Serial No. 128,549

10 Claims. (Cl. 167—65)

This invention relates to compositions of matter containing anti-hygroscopic agents and it comprises as new materials admixtures of solid substances normally hygroscopic with anti-hygroscopic substances to prevent the normally hygroscopic substances from taking up moisture, said anti-hygroscopic substances being chosen from the group consisting of mono and diglycerides of higher fatty acids and mixtures thereof; it further comprises processes wherein hygroscopic substances are admixed with aqueous mixtures of the said anti-hygroscopic substances, and the mixtures dried and powdered.

There are many solid materials which have the property of absorbing moisture from the atmosphere. Calcium chloride absorbs moisture so avidly that in a short space of time dry particles of calcium chloride absorb so much water that they actually dissolve in the absorbed water. Many other inorganic substances are hygroscopic. Organic materials from animal sources are notoriously hygroscopic. Fertilizers made from waste animal or vegetable products rapidly absorb moisture from the atmosphere and "cake up". Biological preparations for therapeutic uses are noted for their ability to absorb large quantities of moisture. This characteristic of biologicals is so pronounced that careful control of room humidity must be exercised when these substances are to be molded in the form of pills and tablets. If the room contains much moisture in the air it is practically impossible to form dried, powdered biological extracts into pills.

Thus, for example, when making bile salt tablets the hygroscopic nature of the bile salts makes it necessary to add enough of a diluent such as corn starch or milk sugar to the dried bile salts to temporarily protect them from water absorption. The diluent will be as much as 40 percent of the total weight of the bile salt tablet. Such adulterants are necessary in order to give a mixture which can be processed in the tablet-forming machines without sticking, but it does not protect the tablet against water absorption except temporarily. Such highly hygroscopic tablets are almost always given an enteric coating to prevent moisture absorption and fusing of the tablets.

In addition, it has always been necessary to mix the tablet batch with naphtha just prior to pilling to remove absorbed moisture.

Similar difficulties are encountered in the preparation of tablets made from dried liver extract. The large amount of corn starch or milk sugar incorporated in such dried extracts prior to pilling is such that the most concentrated liver extract capsule now on the market is the equivalent of only 20 grams of liver.

Similar difficulties are met with in connection with beef extracts. In the first place it is difficult to obtain a dry powdered extract of beef or meat except by the use of special drying expedients. When beef extract is concentrated in the ordinary way only thick syrupy materials can be obtained. If the drying is prolonged, much decomposition may occur. Such beef concentrates are notoriously hygroscopic.

I have now discovered ways of preventing hygroscopic materials of the kind noted above from absorbing water. My invention is based upon the discovery that the mono and diglycerides of higher fatty acids, or mixtures of mono and diglycerides, will behave as anti-hygroscopic agents when admixed with highly hygroscopic materials of the kind noted. Relatively small quantities of the anti-hygroscopic agents are necessary, usually about 5 to 15 percent, based on the weight of hygroscopic material to be protected.

These mono and diglycerides of higher fatty acids can be made in various ways. One simple way is to react a triglyceride such as tristearin with glycerine. When two molecular weights of glycerine are used for each molecular weight of triglyceride the reaction product consists mostly of monoglyceride. When one molecular weight of glycerine is reacted with one molecular weight of one triglyceride the resulting product consists mostly of a diglyceride.

Ways have been described in the literature for preparing these mono and diglycerides. All of them are glycerine esters of higher fatty acids, the ester having one or two unesterified, or free hydroxyl groups. By higher fatty acid I mean those acids customarily found in fats and fatty oils. These are acids having 10 or more carbon atoms. The more frequently occurring fatty acids of this type are palmitic and stearic. Others are lauric and myristic. Thus, for example, ordinary tristearin can be made to yield either mono or distearin by reacting the tristearin with glycerine. Other ways of preparing these mono and diglycerides are disclosed in U. S. Patents 2,022,493 and 2,022,494 to Carl W. Christensen.

Since mono and distearin are the more common mono and diglycerides I shall describe my invention in greater detail with reference to the use of these substances. It is to be understood, however, that other mono and diglycerides of the higher fatty acids can be used. As stated, I have discovered that these substances are useful for preventing normally hygroscopic materials from absorbing water. Consequently, in broadest aspects, my invention consists in incorporating such mono and diglycerides with the hygroscopic material to be protected. These mono and diglycerides have many special advantages when used with substances such as meat extracts, biologicals, and similar materials to be consumed by humans. The mono and diglycerides are edible materials and dissolve readily in water. Consequently, beef extracts, for example, made up in powdered form with the use of my glycerides can be readily dissolved to form a soup stock.

Although the mono and diglycerides are soluble in water this does not mean that they themselves are hygroscopic. There are similar analogies in chemistry, for example, mono sodium phosphate is highly soluble in water yet it readily loses moisture and it dries out when exposed to air. In other words, it is efflorescent. One very real advantage in connection with mono and diglycerides for the purpose stated is that they are not of themselves hygroscopic at all. Most of the dry sugars such as glucose, lactose and similar materials hitherto used to temporarily reduce the hygroscopic tendency in materials take up moisture.

Tablets and pills made with the use of mono and diglycerides require no enteric coating for preventing water absorption. Many of the enteric coatings hitherto used on tablets greatly reduce the rate at which the tablet dissolves in the stomach contents.

The mono and diglycerides, moreover, are colorless and, hence, do not mar the appearance of the dried tablets; they are not attacked by bacteria, yeast or molds, they appear to give an air-tight coating to the materials treated and thus protect against oxidation. They are neutral in reaction which means that they can be used with substances likely to be inactivated by acidity or alkalinity; their melting point is around 65° to 70° C. or higher which is an advantage when the tablets are formed in the pilling machine.

I shall now describe specific ways of applying my invention. As described above, bile salts are highly hygroscopic. By mixing the wet bile salts with 5 percent of monostearin and subsequently drying in the usual way, I am able to obtain a bile salt mixture which can be powdered and which does not absorb moisture. The mixture can be formed readily into tablets and pills without the addition of any further constituent. Since an ordinary bile salt tablet contains two grains of bile salts and about the same quantity of sugar it will be apparent that bile salt tablets containing only 5 percent of monostearin, or of mixtures of monostearin and distearin will not be nearly as large. The wet bile salts are usually admixed with aqueous pastes of the monoglyceride. Such pastes can be those obtained as an initial reaction product in processes of making the monoglyceride, and the pastes contain varying quantities of water, usually about 25 to 50 percent. In other words, I need not make a substantially dry monoglyceride, such as monostearin or monopalmitin, for incorporation with the bile salts. Since these monoglycerides and diglycerides are good emulsifiers I can simply emulsify the bile salts and monoglyceride, or paste thereof, in a small amount of water to get a paste-like mass and then subject this mass to the ordinary drying conditions customarily used for drying bile salts. The dried product can be readily scraped from the drier pans, ground to a fine powder, and then capsuled or pilled. Most probably small particles of the dried bile salt carry a very thin coating of the monoglyceride.

The preparation of dry liver concentrates presents a very difficult drying problem because of the peptones and proteoses present. Although the concentrate can be dried to a powder this powder quickly takes up moisture from the air. If I first admix the liver concentrate with an aqueous paste of the monoglyceride or diglyceride, for example, mono or distearin, monopalmitin, dipalmitin, or various mixtures of these glycerides, and then subject the mixture to drying in vacuo, I obtain a dry liver concentrate which is not hygroscopic at ordinary room humidities and can be tableted and capsuled without difficulty. Weight for weight I can make liver tablets which are much more concentrated than those hitherto prepared. As noted above, an ordinary liver extract tablet will contain not more than the equivalent of about 20 grams of liver. This low concentration is due to the large amount of sugar hitherto added to temporarily prevent water adsorption. By my invention I can make a tablet of the same weight but which contains the equivalent of 60 grams of liver. The actual amount of mono or diglyceride present in the tablet may be as much as 15 percent but is generally lower. From 5 to 10 percent of mono or diglyceride, dry basis, is enough to protect the tablet from water absorption.

When making liver concentrates I follow the usual method for making a dry liver concentrate, but before evaporating the concentrate to dryness I incorporate about 15 percent by weight of monostearin, or an aqueous paste thereof. This paste can consist of about equal quantities of water and monostearin. An excess of water does no harm but increases the quantity which must eventually be evaporated. For example, the finely-hashed fresh livers are boiled for 30 minutes with three times their weight of water. The mix is filtered and the juice concentrated to a small volume in vacuo. Ethyl alcohol is next added until the alcohol concentration reaches 70 percent. At this point an inert precipitate settles and is discarded. The juice is concentrated in vacuo to a syrup containing about 35 percent moisture. This syrup is then poured into 7 volumes of absolute alcohol and stirred well to extract glucose as well as other undesirable substances. The alcohol is decanted leaving a substance known in the literature as the fraction which contains the anti-anemic principle.

The glucose free, anti-anemic fraction is mixed with 15 percent of monostearin which has been previously heated and emulsified first with an equal weight of water. The mix is then heated to about 55° C. to produce a smooth emulsion and is then dried in pans in vacuo at a temperature of 130° F. The dry material is then finely ground and is now ready for capsule filling or tablet manufacture.

It is unnecessary to remove the alcohol from the final absolute alcohol precipitate which is the fraction previously mentioned since the emulsifier is capable of forming a stable emulsion even when large amounts of alcohol are present. This alcohol in turn facilitates drying.

Dry powdered meat extracts can be prepared in similar ways. For example, I preliminarily concentrate beef extract until it has reached a syrupy consistency. I then admix with the syrup about 10 to 15 percent of its weight of an aqueous monostearin paste and continue the drying until a dry powder results. This powder can then be capsuled for oral administration or it can be sold for making soup stock much like bouillon cubes. Various seasoning constituents such as spices, salt and the like can be incorporated in the beef extract to give what is known as a bouillon concentrate if desired.

In the foregoing examples I have referred more specifically to those highly hygroscopic materials of animal origin. My invention is also applicable to the preparation of various inorganic salts and compounds which are normally hygroscopic and which it is desired to reduce this characteristic.

I have mentioned above that I can incorporate my anti-hygroscopic materials in fertilizers. The preparation of a non-hygroscopic fertilizer material is a rather difficult problem and many patents have issued dealing with the subject. Fertilizers used for dusting, or to be spread rather evenly and uniformly on the soil should be free-flowing powdery materials which do not cake up during storage. When small amounts of mono or diglycerides are incorporated, I obtain products the particles of which do not tend to fuse together as a result of water absorption, and thus the caking tendency is materially lessened. The amounts of mono or diglycerides to be added to the hygroscopic materials are not at all critical. Too much is, of course, wasteful and too little may not effectively coat the particles. The amount present on a dry basis is usually from 5 to 15 percent by weight of the amount of hygroscopic material.

Because my invention is of wide application in the arts I claim it broadly in the appended claims. And in the appended claims I use the language "the group consisting of mono and diglycerides of higher fatty acids" to generically define the substances which I use.

Having thus described my invention, what I claim is:

1. An intimate powdered mixture of a solid, normally hygroscopic organic material of animal origin and an anti-hygroscopic agent chosen from the group consisting of mono and diglycerides of higher fatty acids, said agent preventing caking of the powdered hygroscopic material in the presence of atmospheric moisture.

2. An intimate powdered mixture of a solid, normally hygroscopic organic material of animal origin and an anti-hygroscopic agent comprising monostearin, said agent prevent caking of the powdered hygroscopic material in the presence of atmospheric moisture.

3. An intimate powdered mixture of a solid biological material which is normally hygroscopic and an anti-hygroscopic agent chosen from the group consisting of mono and diglycerides of higher fatty acids, said agent preventing caking of the powdered hygroscopic material in the presence of atmospheric moisture.

4. An intimate powdered mixture of a solid biological material which is normally hygroscopic and an anti-hygroscopic comprising monostearin, said agent preventing caking of the powdered hygroscopic material in the presence of atmospheric moisture.

5. An intimate powdered mixture of bile salts and an anti-hygroscopic agent chosen from the group consisting of mono and diglycerides of higher fatty acids, said agent preventing caking of the powdered bile salts in the presence of atmospheric moisture.

6. An intimate powdered admixture of bile salts and an anti-hygroscopic agent comprising monostearin, said agent preventing caking of the powdered bile salts in the presence of atmospheric moisture.

7. An intimate powdered mixture of a dry liver concentrate and an anti-hygroscopic agent chosen from the group consisting of mono and diglycerides of higher fatty acids, said agent preventing caking of the powdered liver concentrate in the presence of atmospheric moisture.

8. An intimate powdered mixture of a dry liver concentrate and an anti-hygroscopic agent comprising monostearin, said agent preventing caking of the powdered liver concentrate in the presence of atmospheric moisture.

9. An intimate powdered mixture of dried meat extract and an anti-hygroscopic agent chosen from the group consisting of mono- and diglycerides of higher fatty acids, said agent preventing caking of the dried meat extract in the presence of atmospheric moisture.

10. The mixture as in claim 9 wherein the anti-hygroscopic agent is monostearin.

HAVARD L. KEIL.